United States Patent
Kinzelmann et al.

(10) Patent No.: US 10,934,458 B2
(45) Date of Patent: Mar. 2, 2021

(54) ADHESION METHOD USING THIN ADHESIVE LAYERS

(71) Applicant: Henkel AG & Co. KGAA, Duesseldorf (DE)

(72) Inventors: Hans-Georg Kinzelmann, Pulheim (DE); Michael Gierlings, Hilden (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/609,832

(22) Filed: Jan. 30, 2015

(65) Prior Publication Data

US 2015/0140307 A1    May 21, 2015

Related U.S. Application Data

(63) Continuation of application No. PCT/EP2013/065492, filed on Jul. 23, 2013.

(30) Foreign Application Priority Data

Jul. 31, 2012   (DE) .................. 10 2012 213 397.6

(51) Int. Cl.
| | | |
|---|---|---|
| *C09J 5/06* | (2006.01) | |
| *B32B 37/12* | (2006.01) | |
| *B32B 38/00* | (2006.01) | |
| *B32B 7/12* | (2006.01) | |
| *C08J 5/12* | (2006.01) | |
| *B32B 29/00* | (2006.01) | |
| *B32B 27/08* | (2006.01) | |
| *B32B 27/10* | (2006.01) | |
| *B32B 15/08* | (2006.01) | |
| *B32B 37/20* | (2006.01) | |

(52) U.S. Cl.
CPC  *C09J 5/06* (2013.01); *B32B 7/12* (2013.01); *B32B 15/08* (2013.01); *B32B 27/08* (2013.01); *B32B 27/10* (2013.01); *B32B 29/002* (2013.01); *B32B 37/1207* (2013.01); *B32B 37/1284* (2013.01); *B32B 38/0008* (2013.01); *B32B 38/0036* (2013.01); *C08J 5/121* (2013.01); *C08J 5/124* (2013.01); *B32B 37/203* (2013.01); *B32B 2037/1253* (2013.01); *B32B 2250/03* (2013.01); *B32B 2307/718* (2013.01); *B32B 2309/02* (2013.01); *B32B 2309/04* (2013.01); *B32B 2309/12* (2013.01); *B32B 2309/14* (2013.01); *B32B 2310/0825* (2013.01); *B32B 2367/00* (2013.01); *C09J 2301/416* (2020.08); *Y10T 156/10* (2015.01)

(58) Field of Classification Search
CPC .......... C09J 5/06; B32B 37/12; B32B 38/00; B32B 7/12
USPC .............................. 428/219; 156/60
See application file for complete search history.

(56) References Cited

U.S. PATENT DOCUMENTS

| | | | | |
|---|---|---|---|---|
| 4,794,030 | A * | 12/1988 | Celia ..................... | B29B 13/023 428/156 |
| 5,250,610 | A * | 10/1993 | Hansel ............... | C08G 18/0823 428/423.1 |
| 6,074,755 | A | 6/2000 | Rasmussen et al. | |
| 6,099,676 | A | 8/2000 | Hayashi | |
| 6,270,874 | B1 | 8/2001 | Iwashita et al. | |
| 2002/0006484 | A1* | 1/2002 | Ramalingam ............ | B32B 7/12 428/35.3 |
| 2004/0234739 | A1* | 11/2004 | Cavalli .................. | C09J 133/02 428/221 |
| 2005/0016673 | A1* | 1/2005 | Krebs ...................... | C08J 5/128 156/275.7 |
| 2006/0078741 | A1* | 4/2006 | Ramalingam, Jr. .... | C08G 18/10 428/411.1 |
| 2006/0182957 | A1* | 8/2006 | Simons .................... | B32B 7/12 428/355 R |
| 2006/0292378 | A1* | 12/2006 | Mgaya ...................... | B32B 7/12 428/423.1 |
| 2009/0149612 | A1* | 6/2009 | Stadlbauer .............. | C08F 10/06 526/90 |
| 2010/0086712 | A1* | 4/2010 | Moller ................. | C08G 18/672 428/34.9 |
| 2010/0136347 | A1* | 6/2010 | Simons .................. | B32B 27/32 428/423.7 |
| 2012/0156382 | A1* | 6/2012 | Eichelmann ......... | C08G 59/184 427/386 |
| 2013/0068386 | A1* | 3/2013 | Lack .................... | C08F 290/067 156/275.5 |
| 2015/0140307 | A1* | 5/2015 | Kinzelmann ............. | B32B 7/12 428/219 |

FOREIGN PATENT DOCUMENTS

| | | |
|---|---|---|
| DE | 102005028661 A1 | 12/2006 |
| DE | 69736063 T2 | 1/2007 |
| EP | 2489760 A1 | 8/2012 |
| JP | 44-8741 B | 4/1969 |
| JP | S52152434 A | 12/1977 |
| JP | H1071649 A | 3/1998 |
| JP | 2002528308 A | 9/2002 |
| JP | 2003025426 A | 1/2003 |
| JP | 2006282812 A | 10/2006 |
| JP | 2012-184402 A | 9/2012 |
| WO | 9703821 A1 | 2/1997 |
| WO | 2011045833 A1 | 4/2011 |

* cited by examiner

OTHER PUBLICATIONS

International Search Report for International Application No. PCT/EP2013/065492 dated Nov. 29, 2013.

*Primary Examiner* — Tahseen Khan
(74) *Attorney, Agent, or Firm* — James E. Piotrowski

(57) ABSTRACT

The invention relates to a method for adhering flexible substrates, the connecting adhesive layer being formed in a thin manner. The invention further relates to a composite substrate, wherein the two substrates are connected by a thin flexible adhesive layer.

18 Claims, No Drawings

ADHESION METHOD USING THIN ADHESIVE LAYERS

The invention relates to a method for adhesively bonding flexible substrates, wherein the connecting adhesive layer is thin. The invention further relates to a composite substrate, wherein the two substrates are connected by a flexible, thin adhesive layer.

DE 10 2005 028 661 describes a method in which two-layer films of thermoplastic materials can be manufactured continuously. These involve a thicker film and a thinner second film made of the same material. The two films are heated at a defined ratio so that the surfaces become softened and begin to melt. They are then connected to one another immediately afterward. The use of an adhesive to connect the materials is not described.

EP 1 465 959 describes a method for laminating films onto shaped elements, wherein a reactive polyurethane hot melt adhesive is applied onto the film surface. The film is then activated by heating, and adhesively bonded to the shaped element.

EP 0 659 829 describes the connecting of laminating films to a carrier substrate, wherein a multi-layer film is manufactured from two different film layers by lamination and stamping, with heating using calender rollers. These two-layer decorative films are laminated onto a plastic profile by means of a cold-curing adhesive.

DE 44 19 414 A1 describes a method for manufacturing papers having a plastic film, wherein the plastic film is firstly equipped with a laminating agent and the paper is subsequently laminated against the plastic film, for example in a roller laminator under pressure. The plastic film can be made, inter alia, of polypropylene or polyester, i.e. thermoplastic materials. According to the exemplifying embodiments the laminating agent is applied in quantities of between 3 and 8 g/m². For example, aqueous dispersion adhesives, resins, or hot melts, solvent-containing or solvent-free adhesives in the form of one- or two-component adhesives can be used. If an aqueous dispersion is used as a laminating agent, a sufficient quantity of the water present in the paper is evaporated by a heat treatment. This heat treatment takes place after lamination and does not serve to soften the plastic film immediately before, during, or after adhesive bonding. A method in which the adhesive is firstly applied onto the paper and is then brought together with a heated thermoplastic is not described.

DE 10 2005 023 280 A1 describes a contact adhesive film for releasable retention of objects. The contact adhesive film comprises two polymer-based film layers that can be connected using a polymer adhesive. The films can be made of thermoplastic material. Only polymer films having special mutually coordinated properties are suitable, however. These properties include, for example, different extensibility values, different peel capabilities, sealing and non-sealing capability, and different Vicat softening temperatures. The layer thickness of the polymer adhesive layer is preferably 0.5 to 5 µm, in particular 1 to 3 µm. The method for manufacturing the laminates is not described.

DE 10 2009 045 395 A1 describes double-sided contact adhesive tapes made from a carrier layer coated with an adhesive compound. The carrier layer is a laminate that is constructed from at least two film layers connected to one another by a laminate adhesive layer. The film layers are made of extrudable or castable polymers. For better chemical anchoring they can be physically and/or chemically pretreated, for example by corona, plasma, or flame treatment and by etching, treatment with chemical primers, or UV photoinitiators. The layer thickness of the laminate adhesive is said to be at least 2 µm (approx. 2 g/m²), better at least 3 µm (approx. 3 g/m²), but can also be appreciably greater, specifically more than 10 µm (approx. 10 g/m²), more than 50 µm (approx. 50 g/m²), or in fact more than 100 µm (approx. 100 g/m²). The exemplifying embodiments describe carrier layers that are each made of two corona-pretreated PET films that are connected to one another with at least 5 g/m² of a UV-curable laminate adhesive. In order to manufacture the carrier layer, one of the two films is for that purpose coated with the adhesive using a blade, laminated against the other film, and the films are adhesively bonded to one another under UV radiation. A heat treatment to soften the plastic film immediately before, during, or after adhesive bonding is not described.

Methods for manufacturing films that are connected to one another without an adhesive layer are known. A special selection of film materials and a correspondingly coordinated method process are necessary for this. In order to achieve corresponding adhesive bonding, the surfaces and the materials of the substrates to be connected must be coordinated with one another. It is furthermore known to apply flexible film substrates onto solid plastic or metal substrates. This can be done using an adhesive, but in this case it is usual for an adhesive layer of sufficient thickness to be applied.

When substrates having a rough surface are used, it is necessary to introduce a quantity of adhesive that completely covers the surface. Only with this prerequisite is full-coverage adhesive bonding possible. This is intended to avoid delamination as a result of water, weathering, or other influences. Defects are often evident as bubbles. Visible shortcomings of this kind are undesired. It is known that for this reason, an elevated quantity of adhesive must be applied.

When flexible substrates are adhesively bonded, it is known that the adhesive layer on the one hand is intended to ensure full-coverage adhesive bonding. On the other hand, however, this layer must not be too thick, so that the adhesively bonded composite substrate has flexibility. This can then result in cracks and delamination in the adhesive bond. For many purposes, the adhesive layer also must not be detectable between the film substrates.

The object of the present invention is therefore to make available a method in which films can be adhesively bonded onto different substrates, for example solid substrates or flexible substrates. Only a small amount of adhesive is to be applied. Full-coverage adhesive bonding is furthermore to be ensured. A further aspect of the present method is that rapid adhesive bonding is achieved thanks to the method procedure, further processing of the resulting adhesively bonded substrates being accelerated.

The object is achieved by a method for adhesively bonding two substrates, wherein an adhesive is applied at a coating weight of less than 2 g/m² onto one substrate, that substrate is brought together with a second film-shaped substrate made of a thermoplastic, wherein the surface of the second substrate is converted into a softened state by heating, and the substrates are adhesively bonded to one another, before, during and/or immediately after heating, by means of pressure.

A plurality of different materials can be used as substrates for the method according to the present invention. These can be solid materials, for example wood materials, metals, for example aluminum, iron, or zinc, thermosetting plastics or thermoplastics, such as polyvinyl chloride (PVC), polypropylene (PP), polystyrene (PS), acrylonitrile-butadiene-styrene copolymers (ABS), polyesters, or polyamides, organic polymers such as cellophane; paper, paperboard, or other materials, although flexible film-shaped materials can also be used as a first substrate. Multi-layer substrates can be selected; the surface can be coated, for example with metal, oxide, or plastic coatings, imprinted, colored, or chemically modified. Such materials are suitable, for example, as a first substrate. Substrates can also be selected, however, from the materials that are suitable as a second substrate.

Flexible film materials are suitable as a second substrate, for example those made of thermoplastics in film form, e.g. polyolefins such as polyethylene (LDPE, LLDPE, metallocene-catalyzed PE, HDPE) or polypropylene (PP, CPP, OPP); polyvinyl chloride (PVC); ethylene copolymers such as ethylene vinyl acetate (EVA), ethylene acrylate copolymers (EMA), EMMA, EAA; polyesters; PLA, polyamide, or ionomers such as ethylene/acrylic acid copolymers. The film materials can also be modified, for example by modifying the plastic surface with functional groups, or additional components, for example pigments, dyes, can be contained in the films. These thermoplastics are to have a softening point (measured by DSC) below 200° C., in particular below 150° C. Composite substrates are also possible as a second substrate, provided the surface to be adhesively bonded is thermoplastically coated. The films can in general be colored, colorless, or transparent. Polyolefins and other ethylene copolymers are especially suitable as polymers. "Flexible films" are to be understood as the usual thin, web-shaped substrates that are known, for example, as packaging film, decorative film, tape, or in similar forms.

The softening point is the melting point (melt peak temperature $T_{pm}$) that can be determined in accordance with DIN EN ISO standard 11357-3:2001 at a heating rate of 10 K/min.

A pretreatment of the surface of the substrates can be carried out. The plastic surfaces can be cleaned, and they can optionally also be subjected, before adhesive bonding, to a physical, chemical, or electrochemical pretreatment.

In accordance with the inventive procedure, an adhesive is applied onto a first substrate. The adhesive can be applied using known procedures, for example spraying, blading, roller application, printing, or other known methods. According to the present invention the adhesive is to be applied at a thin layer thickness. This substrate can be a solid substrate, but can also be a film-shaped flexible substrate. The adhesive to be applied can be adapted to the adhesive bonding requirements. If aqueous adhesives are used, it is useful if water is removed from the surface. If solvent-containing adhesives are selected, the surface must be stable with respect to the solvent contained. If hot melt adhesives are selected, the surface should not be negatively affected by the possible heat input. Reactive adhesives can optionally yield improved adhesion to the substrate. If radiation-cross-linking adhesives are used, an irradiation of the adhesive layer can preferably occur before the substrates are joined together, in order to obtain cross-linking.

The method procedure can include, if necessary, corresponding features such as drying zones, heating zones, or other supporting measures in order to adapt to the adhesive. After application of a suitable adhesive onto the first substrate, the second substrate is brought together with the first substrate and adhesively bonded.

It is necessary according to the present invention for the second substrate to be heated, immediately before or during or after adhesive bonding of the substrates, at the surface to be adhesively bonded. The heating is preferably to be carried out so that only the surface is heated; there is to be as little disadvantageous influence as possible on the mechanical properties of the second substrate. Heating can occur directly on the surface to be adhesively bonded, but it is also possible to use noncontact heating methods.

Methods for heating substrates are known. This can be done, for example, by heating with hot objects; for example a hot roller can be passed over the substrate. Another embodiment heats the surface by the passage of hot gases; it can be flame-treated; a plasma treatment can be carried out. A further embodiment uses electromagnetic radiation in the radio frequency region, in the microwave radiation region, in particular IR radiation or NIR radiation. A further embodiment uses heating via ultrasound. Apparatuses for heating a surface are known in principle to one skilled in the art.

It is useful if the heating occurs quickly and if only the region of the surface to be adhesively bonded is heated. It is thereby possible to ensure that there is little or no negative effect on the mechanical properties of the second substrate. It is moreover also possible to provide a support on the back side of the second substrate in order to maintain the shape. In a first embodiment, the two substrates are brought together and adhesively bonded immediately after heating. To ensure that the surface of the second substrate does not cool off too much after heating before the substrates are adhesively bonded, the substrates should preferably be brought together less than 10 s, more preferably less than 1 s, in particular less than 0.1 s after heating of the second substrate.

Especially for the case of heating via ultrasound, it is useful if firstly the two substrates are brought together and then heating of the adhesively bonded surface is carried out through the film substrate. In this case heating occurs after the substrates have been brought together, specifically while the adhesive has not yet cured. The maximum time available depends on the adhesive used. Heating preferably takes place, however, within 1 hour, more preferably within 10 minutes, in particular within 1 second after the two substrates are brought together.

In a further embodiment the substrates are adhesively bonded to one another by pressure while that surface of the second substrate which is to be adhesively bonded is brought into a softened state by heating.

Heating is to occur at the surface to a temperature that preferably corresponds approximately to the softening temperature of the thermoplastic substrate. For example, the surface of the second substrate is preferably to be heated to a temperature +/−40° C. from the softening temperature (softening temperature measured by DSC) of the polymer at the surface, particularly preferably +/−20° C. At these temperatures the surface of the substrate becomes soft and optionally flowable or deformable under pressure. It is known to one skilled in the art that polymers can have a narrow softening point, for example a melting point, but that a softening range, in which the material is in a softened state, can also exist.

In a preferred embodiment the first substrate is intended not to have a thermoplastic surface at the heating temperature. The surface of the first substrate is therefore intended not to be softened at the heating temperature. This is the case either when a non-thermoplastic substrate is selected as a first substrate, or when a thermoplastic substrate having a sufficiently high softening temperature is used.

Without prejudice to any theory, it is assumed that the surface roughness of the substrate surface is decreased by heating and by compression against the adhesive-coated first surface. This makes possible a particularly thin layer thickness for the adhesive applied between the substrates. It can be assumed that the surface becomes smoothed so that less adhesive is required for adhesive bonding.

The quantity of adhesive applied is to be less than 2 g/m$^2$, preferably less than 1 g/m$^2$, in particular less than 0.5 g/m$^2$. For each of these three ranges recited, the quantity of adhesive applied is preferably more than 0.05 g/m$^2$, in particular 0.2 g/m$^2$ and more. The optimum quantity applied is selected in accordance with the surface roughness or irregularity of the substrate. Irregularities can result, for example, from imprinting of the substrate, and depend on the printed pattern and on the quantity of printing ink applied. Adhesive bonding under pressure results in a planar bond despite the small quantity of adhesive.

The usual apparatuses for bringing together and for adhesive bonding can be used. For example, stamps, rollers, rolls, plates can be utilized to bring the substrates together, in particular by pressing or rolling the substrates together. The pressure on the substrates occurring when they are brought together by rolling can be e.g. between 0.2 and 15 bar. In the particular embodiment of adhesive bonding of two film substrates, such laminating apparatuses are commonly known to one skilled in the art.

The thin layer of adhesive can also be heated by being brought together with the heated surface. This can result in faster buildup of adhesion and in faster crosslinking.

A suitable adhesive for the method according to the present invention is to be selected from adhesives that can be applied when liquid. These can be aqueous dispersions, solvent-containing nonreactive or reactive adhesives; solvent-free liquid or solid meltable adhesives can be used. They can be one-component systems or a two-component system.

Examples of suitable adhesives are those based on thermoplastic polymers, such as polyurethanes, EVA, polyacrylates; solvent-containing adhesive such as acrylate adhesives, one- or two-component polyurethane adhesives, silane-crosslinking adhesives; reactive melt adhesives such as one-component polyurethane adhesives; or solvent-free one- or two-component polyurethane adhesives, silane systems, or radiation-crosslinkable adhesives.

It is useful according to the present invention if the adhesive has a low viscosity. The viscosity of a suitable adhesive upon application is, for example, up to 10,000 mPas, preferably up to 5000 mPas (measured with a Brookfield viscometer; ISO 2555:2000). The measurement temperature is adapted to the application temperature. For adhesives that are liquid at room temperature, the viscosity is determined e.g. at 20 to 40° C.; for hot melt adhesives the measurement temperature can be 100 to 150° C. For higher-viscosity adhesives it is also possible to measure from 40 to 100° C. Aqueous or solvent-containing adhesives often have a low viscosity of up to 500 mPas; hot melt adhesives often have a viscosity above 1000 mPas.

In accordance with the method according to the present invention, adhesive bonds can be effected over a broad range of applications. When solid substrates are adhesively bonded to film-shaped substrates, the adhesive is applied onto the (optionally pretreated) solid substrate. Onto the surface coated in that manner, a film having a surface made of thermoplastic polymers is applied as a second substrate. Heating of the surface of the thermoplastic film causes the latter to become softened at the surface. By applying pressure upon adhesive bonding it is possible to ensure that a particularly smooth surface of the thermoplastic substrate to be adhesively bonded is obtained. Bubbles and delaminations are not observed. Another embodiment works with a flexible first substrate on which an adhesive is applied in a thin layer. Onto this surface a second film substrate, which is to comprise on the surface a layer of thermoplastic polymers, is then applied likewise under pressure. Here as well, heating and joining to the first substrate ensure that a particularly smooth surface of the second substrate is obtained.

Joining can be assisted, for example, by pressure. This can, for example, amount to 0.2 to 16 bar, exerted on pressure rollers. It is possible according to the present invention to achieve full-coverage adhesive bonding of the substrates with thin adhesive application weights.

Also a subject of the invention is a composite substrate made up of a first substrate, a second substrate having a surface made of thermoplastic polymers, and an adhesive layer located therebetween, wherein said adhesive layer is preferably to have a thickness from 0.05 to 2 μm.

The layer thickness can be determined by the application weight of the adhesive onto the area, for example from 0.05 to 2 g/m$^2$. The first substrate can be a rigid or solid substrate, for example a shaped element made of various materials. These are intended to have little surface roughness. As a further embodiment, the first substrate can be made of a flexible substrate; in this case the material and properties of this flexible substrate are variable within broad limits. The material can also be the same one as the second substrate, but in particular the two substrates are different. The first substrate can optionally also be processed or imprinted. The surface of the first substrate is not influenced by the application of a thin adhesive layer. A possible water content, an organic solvent content, or the low heat content of the applied adhesive are selected so that the properties of the surface of the first substrate are substantially not degraded.

A substrate that is made, at least on the surface to be adhesively bonded, of thermoplastic polymers is selected as a second substrate of the composite object according to the present invention. This can be a single-layer film, but multi-layer films can also be selected. The composite substrate according to the present invention is obtained by joining together and pressing the two different substrates.

The composite substrates according to the present invention exhibit high strength in the adhesively bonded individual substrates. The thin layer thickness of the adhesive layer ensures high cohesion of the adhesive. The thin layer thickness of the substrate furthermore yields improved flexibility for the adhesive layer. Composite substrates according to the present invention can therefore exhibit a high level of stability with respect to elastic deformations.

A further advantage of the method according to the present invention and of the composite elements manufactured therewith is that there is little visible change in the surfaces. Because the adhesive layer is thin it is visually colorless. The visual properties of the composite object are improved or are retained.

A further advantage of the method according to the present invention is the lower stresses in the context of the manufacturing process. Because of the low concentration of solvents or of water, or because of the low heat content of an adhesive suitable according to the present invention, the properties of the various substrates are not impaired. For example, small quantities of water are advantageous for paper substrates. Leaving aside industrial hygiene, small quantities of solvent are also useful for substrates that may be sensitive to solvents. As a result of thin layer thickness, the surface of the first substrate also experiences only a little thermal stress upon application of a hot melt adhesive. The brief heating of the second substrate also means that there is no stress on the first substrate.

The method according to the present invention thus makes available a method for adhesive bonding of multi-layer composite elements in which only a little adhesive needs to be used. Improved adhesively bonded substrates are furthermore obtained.

EXAMPLES

Adhesive 1 (NCO-Terminated Polyester Urethane):
A polyester polyol made of aromatic and aliphatic dicarboxylic acids and polyalkylene diols is reacted with an excess of 4,4'-MDI.
The adhesive has an NCO content of 3.4 wt % NCO based on the solids.
Solids: 50 wt % in ethyl acetate, based on adhesive 1.
Viscosity: 140 mPas (Brookfield LVT at 20° C., spindle 2, shear rate 30 rpm, ISO 2555)
Adhesive 2:
A polyester prepolymer is manufactured using the protocol of Example 1.
The adhesive has an NCO content of 4.0 wt % NCO based on the solids.
Solids: 60 wt % in ethyl acetate, based on adhesive 2.
Viscosity: 300 mPas (Brookfield LVT at 20° C., spindle 2, shear rate 30 rpm, ISO 2555)
Substrate 1: PET film, 12 µm.
Substrate 2: LLDPE film, 60 µm (melting point: 114° C., DSC per DIN EN ISO 11357-3:2011; heating rate: 10 K/min).
Adhesive Bonding Methods:
Method 1: Apply the adhesives with a blade onto substrate 1.
Heat substrate 2 with an IR radiator (1.5 to 1.8 µm wavelength; 10 cm spacing).
Immediately thereafter, adhesively bond the substrates manually.
Method 2: Mechanically apply a dilute adhesive (approx. 10 wt % solids content) onto substrate 1 using a screen roller, at a web speed of 10 m/min.
Remove the solvents in a three-zone dryer.
Adhesively bond using a laminating unit at 60° C.
Ultrasound treatment (20 kHz) of composite at 5 mm spacing from substrate 1.
Method 3: Mechanically apply a dilute adhesive (approx. 10 wt % solids content) onto substrate 1 using a screen roller, at a web speed of 60 m/min.
Remove the solvents in a three-zone dryer.
Heat substrate 2 with an IR radiator (see above), 40 kW, over a length of 1 m along the travel direction.
Adhesively bond using a laminating unit at 60° C.
Determine the application weight by weighing adhesively bonded films and films cleaned with solvent.
Bonding adhesion (peel test on 15-mm wide strips, 100 mm/min) measured per DIN 53278, 2×90°.
Seal adhesion (peel test on 15-mm wide strips, 100 mm/min) measured per DIN 53278, 2×90°).
Boiling test: after four days of storage, adhesively bonded samples were subjected to a boiling test in boiling water. For this the samples were firstly cut up (30 cm×16 cm) and then folded so that the LLDPE film lies against itself and the long side of the laminate is halved (15 cm×16 cm). The two short sides (15 cm) are sealed with a laboratory bench sealing unit having two heating sealing jaws, over a width of 1 cm, at 150° C. for one second and under a pressure of 50 N/cm². The pouch thus produced, open on one side, is filled with 100 ml water, and the open 16-cm long side is again sealed as above over a width of 1 cm. The sealed pouch is then heated in boiling water for 30 minutes.

Experiments

| Experiment | | Layer wt. (g/m²) | Heating | Bonding adhesion, 12 hr (N/15 mm) | Bonding adhesion, 7 days (N/15 mm) | Seal adhesion (N/15 mm) |
|---|---|---|---|---|---|---|
| 1 | Adhesive 1, method 1 | 0.5 | IR | — | 2.5 (material break) | — |
| 2 | Adhesive 1, method 2 | 0.5 | ultrasound | — | 2.7 (material break) | — |
| V 1 | Comparison: method 1, no adhesive | 0 | IR | no bonding adhesion | no bonding adhesion | — |
| V 2 | Comparison: method 2, no adhesive | 0 | ultrasound | no bonding adhesion | no bonding adhesion | — |
| 3 | Adhesive 2, method 3 | 0.5 | IR | 2.5-3.0 (material break) [b] | 2.7 (material break) | 52 |
| 4 | Adhesive 2, method 3 | 0.2 | IR | 2.5-3.0 (material break) | 2.8 (material break) | 53 |
| V 3 | Comparison: method 3, no adhesive | 0 | IR | no bonding adhesion | no bonding adhesion | — |
| 5 | Adhesive 2, method 3, LLDPE (white pigmented) | 0.6 | IR | 4.7 (material break) [b] | 3.4 (material break) [b] | — |
| V 5 | Comparison: adhesive 2, method 3, no heating, LLDPE (white pigmented) | 0.6 | no heating | 1.3 (peel) | 1.8 (peel) | — |
| 6 | Adhesive 2, method 3, PET (imprinted) [a] | 0.2 | IR | — | 1.2-1.5 (peel) | — |

-continued

| Experiment | | Layer wt. (g/m²) | Heating | Bonding adhesion, 12 hr (N/15 mm) | Bonding adhesion, 7 days (N/15 mm) | Seal adhesion (N/15 mm) |
|---|---|---|---|---|---|---|
| V 6 | Comparison: adhesive 2, method 3, no heating, PET (imprinted) [a] | 0.2 | no heating | no adhesion | no adhesion | — |

[a] PET imprinted with an approx. 1-μm thick layer of a blue printing ink.
[b] PET film is torn.

The laminates in which substrate 2 had been subjected to a heat treatment and in which the two films had been adhesively bonded to one another were all visually unobjectionable (transparent, no bubbles).

These adhesively bonded films were furthermore still firmly bonded after boiling, with no delamination. Bonding adhesion remained unchanged (peel test produced material break).

Laminates for which substrate 2 was heated, but on which adhesive was omitted, exhibited no bonding adhesion.

Laminates for which the films were adhesively bonded, but substrate 2 was not heated, exhibited little or no bonding adhesion.

It was furthermore observed that in laminates that had been manufactured with no heating of substrate 2, visual shortcomings were able to occur. The smaller the quantity of adhesive applied, the more likely those shortcomings were to occur.

The invention claimed is:

1. A method for adhesively bonding two substrates, comprising:
    providing a curable adhesive that is free of polyurethane;
    applying the adhesive onto a first substrate at a coating weight of less than 2 g/m²,
    providing a second film-shaped substrate made of a thermoplastic at a first temperature,
    heating the second film-shaped substrate to a second temperature higher than the first temperature to convert the surface of the second substrate into a softened state,
    bringing the first substrate and applied adhesive together under pressure with the heated second film-shaped substrate made of a thermoplastic, and
    curing the adhesive to adhesively bond the first substrate to the second substrate immediately after heating the second substrate.

2. The method according to claim 1, wherein the second substrate is a plastic film having a softening point below 200° C.

3. The method according to claim 1, wherein the adhesive is selected from crosslinkable adhesives in solvent-containing, or solvent-free form.

4. The method according to claim 1, wherein the heating is carried out using plasma or laser treatment, ultrasound, NIR radiation, or IR radiation.

5. The method according to claim 1, wherein two film-shaped substrates are adhesively bonded.

6. The method according to claim 1, wherein the first substrate is selected from wood, thermosetting plastic, thermoplastic, organic polymer, paper and paperboard.

7. The method according to claim 1, wherein the adhesive is selected from ethylene-vinyl acetate, polyacrylate and acrylate.

8. The method according to claim 1, wherein the first substrate is a flexible film, optionally coated with metal.

9. The method according to claim 1, wherein the first substrate is not heated when it is brought together with the second substrate.

10. The method according to claim 1, wherein the curable adhesive applied onto the first substrate is selected from EVA, polyacrylate, acrylate, silane-crosslinking adhesive; reactive hot melt adhesive; radiation-crosslinkable adhesive, and combinations thereof.

11. The method according to claim 1, wherein the second temperature is about +/−40° C. from the softening point of the second substrate.

12. The method according to claim 11, wherein the first substrate does not have a thermoplastic surface at the heating temperature.

13. A composite object comprising at least two substrates adhesively bonded according to claim 1, wherein the adhesive coating weight is less than 2 g/m².

14. The composite object according to claim 13, wherein the adhesive coating weight is less than 1 g/m².

15. The composite object according to claim 13, wherein the second substrate is a flexible thermoplastic film, and the first substrate is selected from paper, metal, plastic, or multi-layer substrates.

16. The composite object according to claim 13, wherein the composite object is a flexible packaging film.

17. A method for adhesively bonding two substrates, comprising:
    providing a curable adhesive;
    providing a first substrate having a planar first surface and an opposing second surface;
    applying the adhesive onto the first substrate first surface at a coating weight of less than 2 g/m²,
    providing a second film-shaped substrate having opposing first and second planar surfaces made of a thermoplastic at a first temperature,
    heating the second substrate second surface to a second temperature higher than the first temperature but no higher than 40° C. above a melting point of the second substrate to convert the second surface of the second substrate into a softened state,
    bringing the first substrate first surface and applied adhesive together under pressure with the heated second substrate second surface, and
    curing the adhesive to form a adhesive bond between the first substrate first surface and the second substrate second surface, wherein the second substrate first surface remains planar after the adhesive bond is formed.

18. A method for adhesively bonding two substrates, comprising:
- providing a curable adhesive;
- providing a first substrate having opposing first and second planar surfaces;
- applying the adhesive onto the first substrate first surface at a coating weight of less than 2 g/m$^2$;
- providing a second film-shaped substrate having opposing first and second planar surfaces made of a thermoplastic at a first temperature;
- heating only the second substrate second surface to a second temperature higher than the first temperature but no higher than 40° C. above a melting point of the second substrate to convert the second surface of the second substrate into a softened state, wherein the first substrate first and second surfaces and the second substrate first surface are not heated to a softened state;
- bringing the first substrate first surface and applied adhesive together under pressure with the heated second substrate second surface in a softened state; and
- curing the adhesive to form a planar adhesive bond between the first substrate first surface and the second substrate second surface.

\* \* \* \* \*